Oct. 7, 1969     A. G. BERT     3,471,738
PERIODIC SLOW WAVE STRUCTURE
Filed Jan. 20, 1967     4 Sheets-Sheet 1
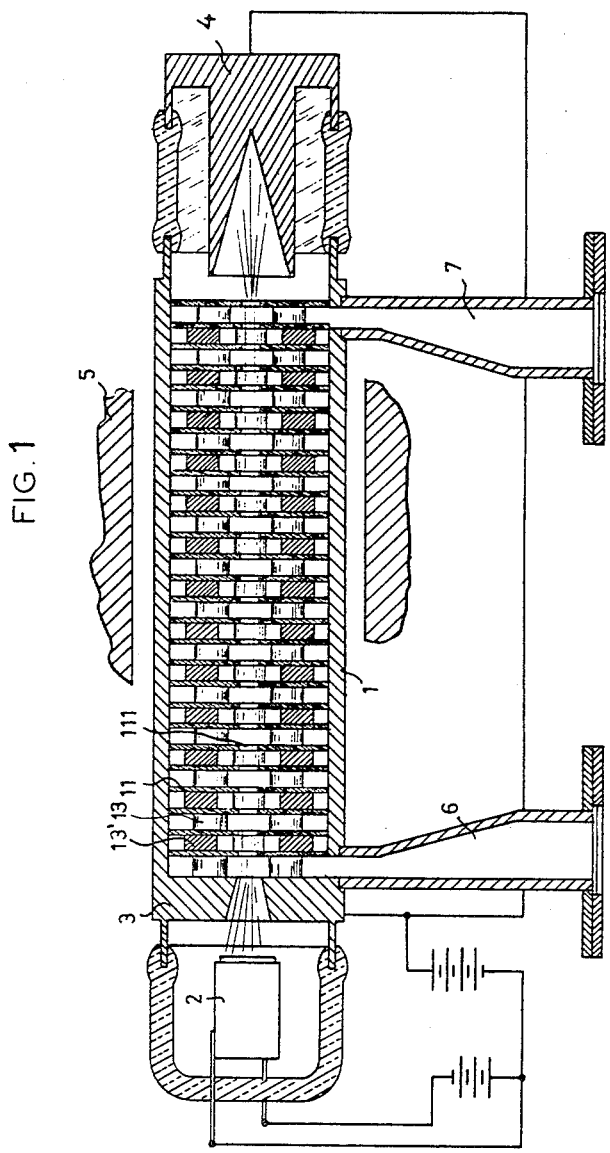
INVENTOR
ALAIN G. BERT
BY
ATTORNEY Oct. 7, 1969     A. G. BERT     3,471,738
PERIODIC SLOW WAVE STRUCTURE
Filed Jan. 20, 1967     4 Sheets-Sheet 2

INVENTOR
ALAIN G. BERT
BY
ATTORNEY

United States Patent Office 3,471,738
Patented Oct. 7, 1969

3,471,738
PERIODIC SLOW WAVE STRUCTURE
Alain G. Bert, Gif-sur-Yvette, France, assignor to Thomson-Varian, Paris, France, a company of France
Filed Jan. 20, 1967, Ser. No. 610,685
Claims priority, application France, Jan. 26, 1966, 47,328
Int. Cl. H01j 25/34
U.S. Cl. 315—3.5                     11 Claims

ABSTRACT OF THE DISCLOSURE

Slow wave circuit comprising cavity-resonators formed by partitions in a circular cylindrical waveguide, said partitions being provided with aligned central apertures and aligned radical slots, and elongated substantially cylindrical conductive members in the form of a post or a draughtsman, having a length equal to the gap between partitions, said members being arranged in each cavity-resonator perpendicularly to the disks, in alternate sectors defined by the radial slots, at equal distance from the slots which enclose them and being staggered alternately from one cavity-resonator to the next by a sector angle.

---

This invention relates in general to periodic slow wave structures and, more particularly, to periodic slow wave structures of the periodically loaded waveguide type in which the waveguide is divided into discrete cavity-resonators having btween one another both capacitive coupling and negative inductive coupling.

It is well known that loaded waveguides are used as wave propagating circuits for traveling wave tubes. These devices are of the filter type circuits consisting of waveguides with some sort of periodic loading to slow down the phase wave velocity to that of the electrons in the beam. The usual sort of periodic loading for a waveguide consists of dividing the waveguide into sections by centrally apertured transverse walls to form a series of cavity-resonators and the sections are coupled together both capacitively and inductively. When the traveling wave tube is designed for operation in the fundamental space periodic mode, the inductive coupling must be negative.

It is also known, that in order for a beam of particles to interact efficiently with the electro-magnetic field of a slowwave circuit, it is necessary for the group velocity and phase velocity over the latter to have the same sign; this is obtained for the fundamental space periodic mode when the cut-off frequency of the "zero" mode is lower than the cut-off frequency of the "π" mode and, for the first harmonic space periodic mode when the "zero" mode cut-off frequency is higher than the "π" mode cut-off frequency.

A certain number of slow wave structures are known for operation in the fundamental space periodic mode, particularly guides in which the partitions separating the successive cavity-resonators are pierced by central capacitive apertures and by radial slots known as inductive coupling slots located in regions of strong magnetic field and in which said cavity-resonators are staggered alternately by rotation from one to the next through a certain angle about the geometrical axis of the structure in such a manner that the components, parallel to the slots, of the magnetic field corresponding to the "zero mode are in opposite directions at each side of the corresponding partition. One of the most interesting structures satisfying these conditions is that known as a "cloverleaf structure in which the lateral wall of each cavity is shaped like a four-leaved clover. Unfortunately, such structures are not easy to produce either from the point of view of machining or from the point of view of assembly.

The principal object of the invention is to provide a microwave slow-wave structure of the type comprising a waveguide divided into compartments with both capacitive and negative inductive coupling therebetween—that is to say comprising cavity-resonators separated by partitions of a conducting metal pierced by a central capacitive coupling aperture and by a plurality of radical inductive coupling slots with equal angular spacings about the geometrical axis of the structure—which has at least performances equivalent to these of the prior art structures but which is much more simple in construction and reproduction.

According to the invention, there is provided a high-frequency periodic slow-wave circuit capable of supporting traveling electromagnetic wave energy thereon comprising a plurality of cavity-resonators successively disposed along and defining an axis of propagation for said electromagnetic wave energy, conductive discs separating said cavity-resonators from one another, central apertures in said discs, an even plurality of radial slots in said discs, radially aligned in all the cavity-resonators, defining equal sectoral portions therein, and inductive posts internal to said cavity-resonators, extending parallel to said axis, contacting the pair of discs defining the cavity-resonator, and located at equal distance from said axis in alternate sectoral portions, the two sectoral portions of two adjacent cavity-resonators in the same radial direction comprising respectively one post and zero post.

This and other objects, characteristics and advantages, will be apparent from the reading the following detailed description of one form of construction given by way of non-limiting example with reference to the accompanying drawings in which:

FIG. 1 is a longitudinal sectional view of a traveling-wave tube equipped with a slow-wave structure according to the present invention;

Figure 6:
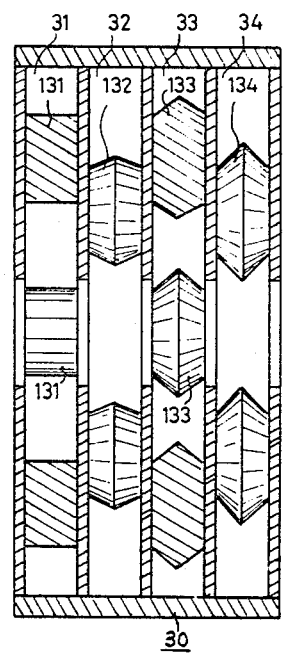
Figure 5:
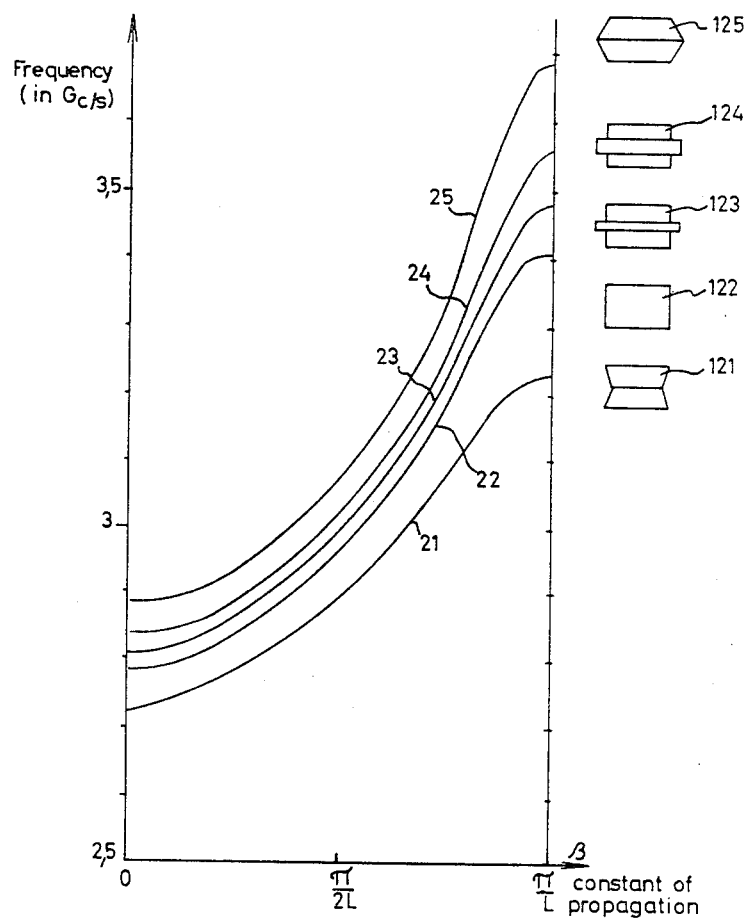

FIG. 5 is an "ω–β" or Brillouin diagram showing the dispersion characteristics for the slow-wave structure of the invention for different shapes of the inductive posts; and FIG. 6 is a cross-sectional view of the four last cavity-resonators of a slow-wave circuit, each equipped with differently shaped posts for tapering the upper cut-off frequency of these cavity-resonators and thereby preventing bandedge oscillations.

Although the present invention will be explained as it is applied to a traveling wave tube amplifier, it will be readily apparent to those skilled in the art that the present invention has applications to many different devices including backward wave oscillators, linear accelerators, microwave filters and velocity modulating devices.

Referring now to FIG. 1 there is shown a traveling wave tube amplifier utilizing a periodical waveguide slow wave structure 1 loaded with disks 11. A cathode assembly 2 provides a beam of electrons which is passed axially through a series of central capacitively coupling apertures 111 in the slow wave structure 1. An anode assembly 3 is brought to a positive potential with respect to the cathode assembly to accelerate and project the beam along the geometrical axis of the slow wave structure. A collector assembly 4 is provided at the terminating end of the slow wave structure and serves to collect the electrons of the beam and dissipate the power therein. A focusing electrical coil 5 surrounds the slow wave structure 1 providing a magnetic field to focus and confine the electron beam, thereby minimizing beam interception within the slow wave structure. An input waveguide section 6 transmits an electromagnetic wave signal to the slow wave structure 1. The signal wave is propagated along the slow wave structure 1 wherein energy is delivered to the signal wave from the electron beam thereby increasing the amplitude of the signal wave. An output waveguide section 7 receives the amplified signal and propagates it to a load (not shown). The mean direction of the radio-frequency power flow on the slow wave circuit defines the direction of circuit development. In the case of a linear tube as shown in FIG. 1 the power flow in the slow wave circuit is coincident with the longitudinal geometrical axis of the tube.

The slow wave structure 1 is constituted in the following manner (see FIGS. 2 and 3). The partitions 11 are spaced apart by a space period L and are pierced, not only with the aforesaid central holes 111, but also with radial-slots 112 providing inductive coupling between the two adjacent cavity resonators. These slots 112, here numbering eight, are equally spaced apart around the geometrical axis of the structure, that is to say at 45 degrees apart and are aligned in the axial direction over the whole length of the structure. Members 13, of a conducting metal and having the height L, which are here in the form of posts of a circular cylindrical shape similar to that of the pieces in draughts, are adapted to disturb the magnetic fields in each cavity and consequently to modify the resonance frequency thereof. These members 13, numbering four in each cavity-resonator, have their centers arranged at the apices of a square centered on the geometrical axis of the structure. Each of them is equidistant from the two slots 112 which surround it without projecting beyond them. The required negative mutual inductive coupling from one cavity-resonator to the next is obtained through the fact that the members 13', in the adjacent cavity-resonator, as shown in particular in FIG. 3, have positions which are derived from the positions of members 13 by rotation through 45 degrees about the geometrical axis of the structure.

Figure 2:
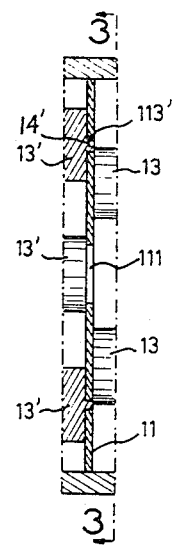
FIG. 2 is a longitudinal sectional view on a larger scale of a set of two cavity-resonators in the structure, this section being taken along the line 2—2 in FIG. 3 in the direction of the arrows.

The members 31, 13' may, for example, be provided with nipples as shown at 14' in FIG. 2 which fit into complementary holes 113' formed in each partition 11 and are finally secured by brazing or any other suitable means.

Example

A slow-wave structure has been constructed which had the following characteristics:

|   | Mm. |
|---|---|
| Internal diameter of the loaded waveguide | 117 |
| Thickness of the partitions between cavity-resonators | 3.2 |
| Diameter of the central capacitive coupling apertures | 17.6 |
| Length of the inductive coupling slots | 34 |
| Width of the inductive coupling slots | 7.2 |
| Distance from their internal edge to the geometrical axis of the waveguide | 11.8 |
| Pitch of the structure | 16.8 |
| Diameter of the inductive posts | 22 |
| Distance from their internal edge to the geometrical axis of the waveguide | 27.8 |

Such a slow-wave structure has a pass-band extending from 2.80 to 3.42 gc./s.; the bandwidth is therefore about 20.5%.

Figure 3:
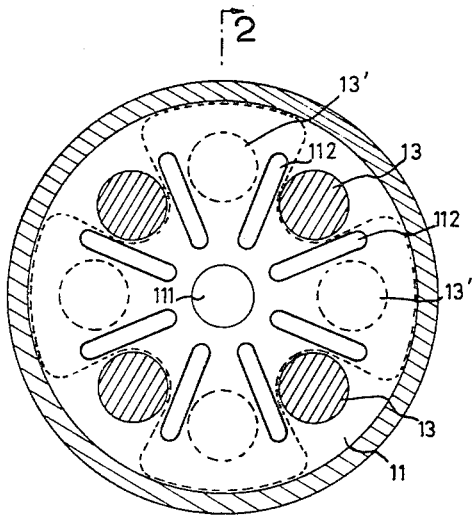
FIG. 3 is a transverse sectional view through one cavity-resonator of the structure.

For the purpose of comparison of the structure of the invention with a clover-leaf structure, let us denote by "osculating clover-leaf structure," the structure shown in dotted line in FIG. 3 in which the circular reentrant portions of the clover-leaf curve have the same radius of curvature as the circular bases of the inductive past, said clover-leaf curve coinciding with said base between the tangency points of two tangents to said base passing through the axis of the section.

Figure 4:
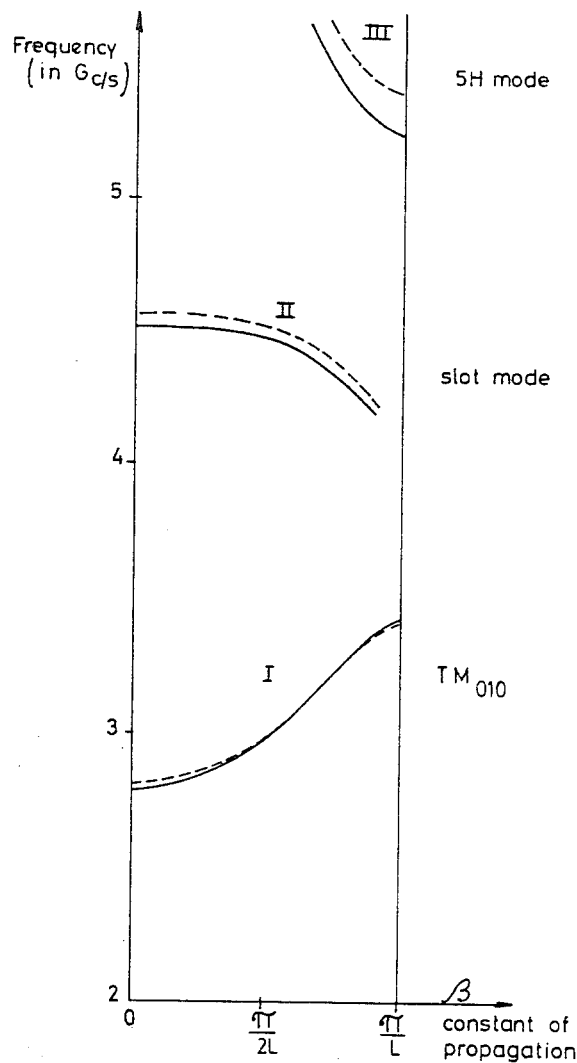
FIG. 4 represents "ω–β" or Brillouin diagrams for symmetrical modes (that is to say those which have an electrical field along the axis) of a structure according to the invention and of a corresponding osculating clover-leaf structure.

The performances of the slow-wave structure of the invention, compared with those of the osculating clover-leaf structure, are practically equivalent as the dispersion or Brillouin diagram of FIG. 4 shows which is drawn for the symmetrical modes. The characteristics illustrated are in full lines for the structure according to the invention and in broken lines for the osculating clover-leaf structure and relate (I) to the $TM_{010}$ mode, (II) to the so-called "slot mode" and (III) to the so-called 5H mode. All the modes which occur in the structure according to the invention are the same as those in a clover-leaf structure.

Nevertheless, it is clear that the slow-wave structure according to the invention is much more simple to manufacture than the clover-leaf one because it enables both complicated machining and delicate centering to be eliminated. Further it is capable of dissipating much larger amounts of heat due to the fact that the cylindrical members 13, 13' constitute heat flow paths and it is well adapted to provide short terminal periodic transition circuit sections tapered in cut-off frequency as will be seen hereinafter.

Although the number of the inductive slots in each partition is eight in the example described above, and that of the pieces in each cavity-resonator is four, the angular offsetting between adjacent cavity-resonators being 45 degrees, it is also possible to use $n$ slots, $n/2$ pieces and an angular offsetting of $2\pi/n$. Such a slow-wave structure is generally called "polystyle" and, in the case where $n=4$, it is called "tetrastyle."

The cut-off frequencies of the cavity resonators depend upon the shape of the post members. FIG. 5 shows the "$\omega-\beta$" diagrams for a given cavity-resonator and different shapes of the post all having the same base and positions unchanged in the cavity-resonator. Post 122 is a right cylinder; post 121 is concave biconical; post 123 is cylindrical with a peripheral collar; post 124 is cylindrical with a peripheral collar higher than in post 123 and post 125 is convex biconical. Curves 21–25 are dispersion characteristics respectively corresponding to posts 121–125. FIG. 4 shows that the "zero" mode cut-off frequency and the "$\pi$" mode cut-off frequency increase from curve 21 to curve 25.

The insertion of posts into the cavity-resonators of a slow-wave structure is well adapted to frequency taperization of the output cavities of a TWT in order to prevent bandedge oscillations without increasing in diameter the coupling center hole between periodic sections, which has the deleterious effect of reducing interaction, or varying the length of the periodic sections.

The frequency taperization consists in changing the shape of the posts in the terminal output sections while keeping constant the diameter of the base of the posts and the position of the centers thereof.

FIG. 6 shows the four last cavity-resonators or sections 31–34 of a slow-wave structure 30. In section 31, the posts 131 are cylindrical ones and have a diameter of 22 mms. In sections 32–34, the posts 132–134 are convex biconical posts of the type of posts 125 in FIG. 5. The diameter of the convex edge of the posts differs in sections 32–34; it is 23 mms. in section 32, 24 mms. in section 33 and 25 mms. in section 34. The corresponding angles and upper cut-off frequencies are the following:

| 131 | 132 | 133 | 134 |
|---|---|---|---|
| 0° | 4°10′ | 8°31′ | 12°40′ |
| 3,410 mc./s. | 3,480 mc./s. | 3,545 mc./s. | 3,610 mc./s. |

The posts 121 and 125 of FIG. 5 have both an angle of 16° and the corresponding upper cut-off frequencies are 3,245 and 3,680 mc./s.

Although the frequency tapering has been disclosed in the case of cylindrical and concave and convex biconical posts, it could be achieved by inserting in the terminal sections of the slow wave structure posts giving a higher or a lower cut-off frequency than the posts in the current sections according to whether the upper or lower cut-off frequency is to be tapered. If the current sections are provided with cylindrical posts, the lower cut-off frequency can be tapered by using concave biconical posts of increasing angle and the upper cut-off frequency can be tapered by using cylindrical posts with collars of increasing height or convex biconical posts of increasing angle. The higher and lower cut-off frequencies both increase when, the radius of the post base remaining constant, the longitudinal cross-sectional area increases.

Since many changes could be made in the above construction and many apparently widely different embodiments of this invention can be made without departing from the scope thereof, it is intended that all matter contained in the above description or shown in the accompanying drawings shall be interpreted as illustrative and not in a limiting sense.

What I claim is:

1. A high frequency periodic slow-wave circuit capable of supporting traveling electromagnetic wave energy thereon comprising a plurality of cavity-resonators successively disposed along and defining an axis of propagation for said electromagnetic wave energy, said cavity resonators being physically oriented with respect to said axis to substantially align at least a portion of the in-phase mode of operation electric field lines within said cavity-resonators with said axis, conductive discs separating said cavity-resonators from one another, central apertures in said discs, an even plurality of radial slots in said discs, radially aligned in all the cavity-resonators, defining equal sectoral portions therein, and inductive posts internal to each of said cavity-resonators, extending parallel to said axis, contacting the pair of discs defining the cavity-resonator, located at equal distance from said axis in alternate sectoral portions in the bisecting plane thereof and spaced apart from the wall of the cavity-resonator, the sectoral portions of the successive cavity-resonators in the same radial direction being alternately provided with an inductive post and deprived of inductive post.

2. A high frequency periodic slow-wave circuit as set forth in claim 1 wherein the inductive posts internal to the cavity-resonators are right cylinders.

3. A high frequency periodic slow-wave circuit as set forth in claim 1 wherein the inductive posts internal to the cavity-resonators are concave biconical posts.

4. A high frequency periodic slow-wave circuit as set forth in claim 1 wherein the inductive posts internal to the cavity-resonators are concave biconical posts.

5. A high frequency periodic slow-wave circuit as set forth in claim 1 wherein the inductive posts internal to the cavity-resonators are straight cylindrical members comprising an external peripheral collar.

6. A high frequency apparatus including a periodic slow-wave circuit capable of supporting traveling electromagnetic wave energy thereon comprising a plurality of cavity-resonators successively aligned along a rectilinear common axis of propagation for said electromagnetic wave energy, conductive discs separating said cavity-resonators from one another, apertures centered on said axis in said discs, an even plurality of radial slots in said discs, radially aligned in all the cavity-resonators and defining equal sectoral portions therein, and inductive posts internal to each of said cavity-resonators, extending parallel to said axis, contacting the pair of discs defining the cavity-resonator, located at equal distance from said axis in alternate sectoral portions in the bisecting plane thereof and spaced apart from the wall of the cavity-resonator, the sectoral portions of the successive cavity-resonators in the same radial direction being alternately provided with an inductive post and deprived of inductive post, and means for producing a stream of charged particles and projecting said stream along said axis for cumulative interaction with said electromagnetic wave energy.

7. A high frequency apparatus as set forth in claim 6 wherein said stream producing and directing means includes a cathode electrode and said periodic slow-wave circuit is operated in use at a potential more positive than said cathode electrode.

8. A high frequency impedance matched periodic slow-wave circuit comprising an array of identical and aligned cavity-resonators separated by conductive discs, central holes and radial slots through said discs respectively providing capacitive coupling and negative inductive coupling between said cavity-resonators, and elongated inductive posts of revolution, internal to each of said cavity-resonators, extending parallel to the axis of the array, contacting the pair of discs defining the cavity-resonator, located at equal distance from the axis of the array in alternate sectoral portions defined by the radial slots, in the bisecting plane of said sectoral portions and spaced apart from the wall of the cavity resonator, the sectoral portions of the successive cavity-resonators in the same radial direction being alternately provided with an inductive post and deprived of inductive post, all said posts having a base of a predetermined area, the principal part of said array forming a main periodic slow-wave circuit having a pass-band with upper and lower cut-off frequencies defining the bandedges of said main periodic slow-wave circuit and the cavity-resonators of said principal part containing identical inductive posts of a first type having a given longitudinal cross-sectional area, and at least one terminal part of said array forming an impedance matching transition section and the cavity-resonators of said terminal part containing inductive posts of a second type having a tapered longitudinal cross-sectional area different from said given area, whereby said transition section has its cut-off frequency tapered in the successive cavity-resonators.

9. A high frequency impedance matched periodic slow-wave circuit as set forth in claim 8 wherein the inductive posts of the first type are cylindrical posts and the inductive posts of the second type are convex biconical posts.

10. A high frequency impedance matched periodic slow-wave circuit as set forth in claim 8 wherein the inductive posts of the first type are cylindrical posts and the inductive posts of the second type are cylindrical posts with an external peripheral collar.

11. A high frequency impedance matched periodic slow-wave circuit as set forth in claim 8 wherein the inductive posts of the first type are cylindrical posts and the inductive posts of the second type are concave biconical posts.

References Cited

UNITED STATES PATENTS

| 2,939,993 | 6/1960 | Zublin et al. | 315—3.5 |
| 3,015,750 | 1/1962 | Skowron et al. | 315—3.5 |
| 3,233,139 | 2/1966 | Chodorow | 315—3.5 |

FOREIGN PATENTS

| 850,521 | 10/1960 | Great Britain. |

HERMAN KARL SAALBACH, Primary Examiner

SAXFIELD CHATMON, JR., Assistant Examiner

U.S. Cl. X.R.

315—36; 333—31, 32